United States Patent [19]

Taylor

[11] Patent Number: 5,384,183
[45] Date of Patent: Jan. 24, 1995

[54] DEGRADABLE FILMS

[75] Inventor: Joe Taylor, Calgary, Canada

[73] Assignee: Novacor Chemicals, Ltd., Calgary, Canada

[21] Appl. No.: 62,603

[22] Filed: May 17, 1993

[30] Foreign Application Priority Data

Jul. 23, 1992 [CA] Canada .................... 2074578

[51] Int. Cl.$^6$ .............................. B32B 7/02
[52] U.S. Cl. .................... 428/216; 428/328; 428/500; 523/126; 524/398; 47/9
[58] Field of Search ............ 428/500, 216, 328; 523/126; 524/398; 47/9

[56] References Cited

U.S. PATENT DOCUMENTS

| 3,867,324 | 2/1975 | Clendinning | 260/23 H |
| 4,705,816 | 11/1987 | Pole | 524/17 |
| 5,096,941 | 3/1992 | Harnden | 523/126 |

Primary Examiner—Edith Buffalow
Attorney, Agent, or Firm—Bruce E. Harang

[57] ABSTRACT

There is a need for degradable films, particularily in agricultural mulch applications. The present invention provides for films having a controlled life from 30 to 160 days. The film comprises photodegradable sheet material having a thickness from 0.1 to 10, preferably, from 0.2 to 5, most preferably from 0.3 to 1.0, mils and comprising a polyolefin sheet and from 50 to 1,000 parts per million of cerium salt of a $C_{16\text{-}20}$ fatty acid and from 1,000 to 20,000 parts per million of titanium dioxide having a particle size less than 0.05 microns.

7 Claims, 1 Drawing Sheet

DEGRADABLE FILMS

FIELD OF THE INVENTION

The present invention relates to photodegradable sheet material. More particularly the present invention relates to photodegradable polyolefinic sheet material.

BACKGROUND OF THE INVENTION

Polymeric materials have a number of advantages over "natural" materials. Generally they are less prone to degradation. While this is an advantage in many applications it is also a disadvantage in some applications. Particularly in packaging applications for food stuffs (i.e. the urban—wilderness camper with the dried food in the plastic packages), or binding applications (i.e. the six pack ring) it would be desirable for the plastic to significantly decompose within a relatively short period of time.

There are however, some other industrial applications where it is also desirable to have plastic material degrade. There are two contrasting applications for plastic sheet film. When plastic material is used as a green house material it should have a fairly long life on the order of at least one year. On the other hand when plastic sheet material is used as a mulch or in row cover applications it is desirable that it lose a significant amount of its tensile strength, preferably at least 50, more preferably from 60 to 80, most preferably more than about 80% loss of tensile properties in from 30 to 160 days.

Plastic mulch is particularly useful in raised bed applications where the bed is prepared and covered with a mulch then subjected to a fluid fumigant or fertilizer. The biggest problem with these applications is that the residual sheet material in the field should be removed before the next preparation of the bed. The old sheet material can get caught in the equipment and cause the new mulch to be improperly put down which can result in a number of problems, including wind flap which cause a loss of young plants.

Canadian patent 1,000,000 sought to address the problem of photodegradability of plastic material by incorporating an unsaturated ketone such as methyl isopropenyl ketone (MIPK) into the plastic. The resulting modified plastic is photodegradable.

U.S. Pat. No. 3,935,141 issued Jan. 27, 1976, to Union Carbide discloses incorporating from 0.002 to 2 weight % (20 to 20,000 ppm) of a cerium salt into polyethylene. The polyethylene must also contain from 0.0025 to 1 weight % of an antioxidant to prolong the life of the polyethylene film. The Union Carbide patent does not suggest that titanium dioxide could also be used in small quantities to prolong the life of the polyethylene film.

At least as early as 1989 Rhone Poulenc published trade literature "Create Your Own Disappearing Act In Plastics With Rhone Poulenc Cerium Stearate". The brochure teaches that polyolefins and polystyrene are photodegraded using cerium stearate. The brochure also teaches on page 2 that cerium stearate can be used with other adjuvants to provide "controlled photo and oxidative degradation of polymeric materials". However, the brochure does not disclose any particular amount or type of adjuvant. Applicant has discovered that titanium dioxide, normally considered an opacifying agent is useful to control the rate of polymer degradation.

U.S. Pat. No. 5,096,941 issued Mar. 17, 1992, from a patent application filed Aug. 23, 1990, assigned to The Dow Chemical Company claims the use of from 0.05 to 0.50 weight % (500 to 5,000 ppm) of cerium +3 stearate to promote the thermo-oxidation and photo-oxidation of polyolefins. The Dow patent does not suggest the use of titanium dioxide in the conjunction with the cerium stearate to help prolong the life of films of polyethylene containing cerium salts.

There are other systems which initiate photodegradation of various polymers such as aromatic compounds or complexes as illustrated by DE 2230790; BE 801695; BE 795406; BE 801 304; BE 795 944; BE 795 405: DE 2 209 254; BE 795 865; DE 2 209 140; DE 2 209 141; DE 2 209 139; and DE 2 209 138, all assigned to BASF. Such aromatic compounds tend to colour the film. In agricultural mulch it may not be desirable to have a darkly coloured film as it may subject the plants to an extreme temperature.

Accordingly there is a need for a system which provides a lightly or white coloured photodegradable sheet material.

SUMMARY OF THE INVENTION

Accordingly the present invention provides photodegradable sheet material having a thickness from 0.1 to 10, preferably, from 0.2 to 5, most preferably from 0.3 to 1.0, mils and comprising a polyolefin sheet and frown 50 to 1,000 parts per million of cerium salt of a $C_{16-20}$ fatty acid and from 1,000 to 20,000 parts per million of titanium dioxide having a particle size less than 0.05 microns.

DETAILED DESCRIPTION

Figure 1:
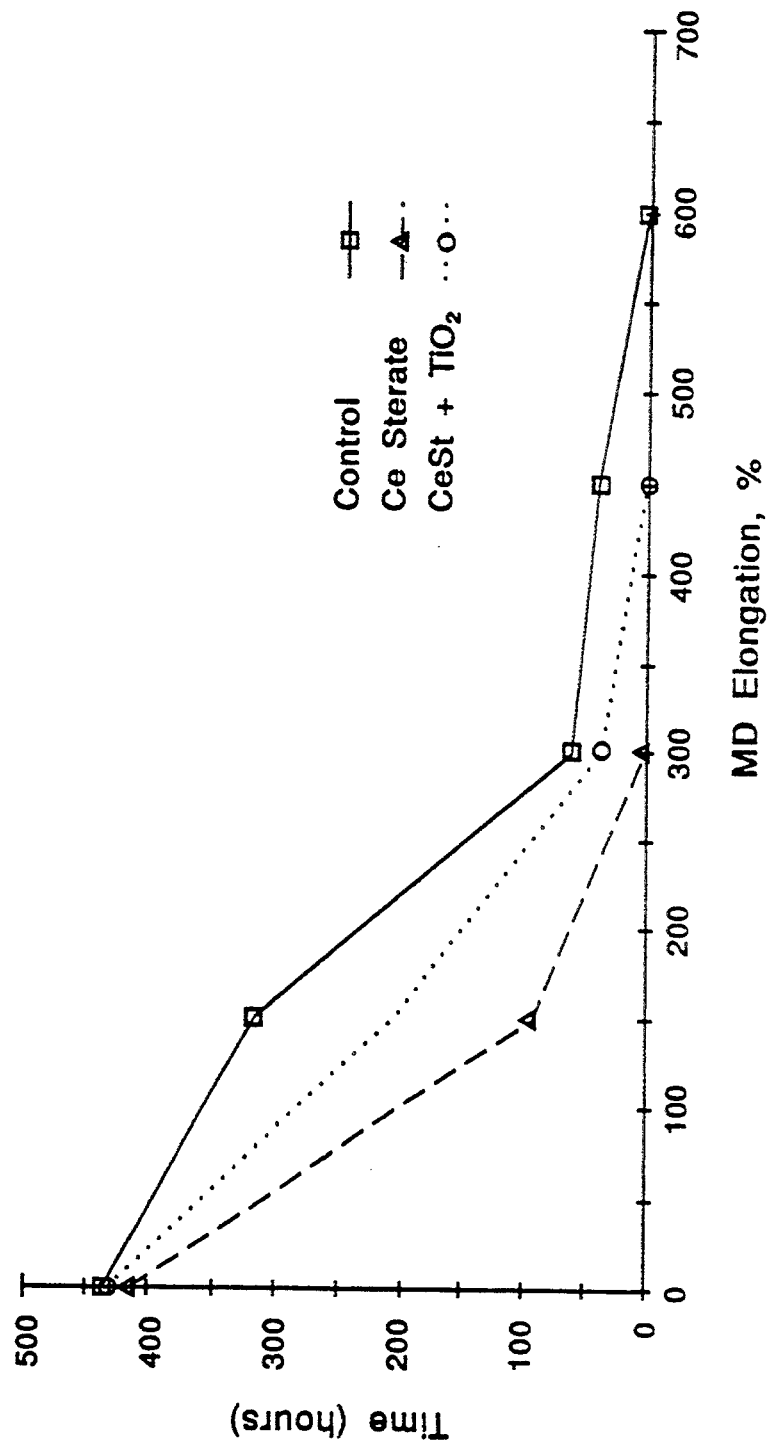
FIG. 1 shows the % elongation of various samples of polyethylene film on exposure to sunlight.

There are a number of suitable alpha olefins including polymers consisting of a predominant amount of least about a total of 60, more preferably 75 weight % of one or more polymers selected from the group consisting of ethylene and propylene and a minor amount, less than 40, most preferably less than 25 weight % of one or more copolymerizable monomers. Copolymerizable monomers include other alpha olefins such as 1-butene and 1-hexene which may be used in very small amounts typically less than 1 weight % to produce various grades of polyethylene and polypropylene. The comonomer may be a cyclic olefin such as 1,4-hexadiene, cyclopentadiene, and ethylidenenorbornene. Additionally, the copolymer could be a copolymerizable carboxylic acid such as acrylic or methacrylic acid. Preferably the polymer is linear low density polyethylene (LLDPE).

The sheet material may be from 0.2 to 5 mils thick. Preferably the sheet material is from 0.3 to 1.0 mils thick.

The cerium compound is a salt of a $C_{16-20}$ saturated fatty acid. Preferably the fatty acid is stearic acid. The cerium compound is present in the polyolefin in an amount from 50 to 1,000, preferably from 100 to 500, most preferably from 200 to 400 parts per million.

The titanium dioxide useful in accordance with the present invention may have a particle size distribution of less than 0.05 microns. Preferably the particle size will be from from 0.010 to 0.020 microns, most preferably from 0.015 1 to 0.020 microns. The titanium dioxide may be present in the sheet material of the present invention in amounts from 1,000 to 20,000 preferably from 5,000 to 12,500 ppm. Preferably the titanium dioxide is rutile.

The compounds of the present invention may be prepared using conventional compounding or blown film equipment and conditions. (Typically the olefin polymer can be mixed with the titanium dioxide and the cerium compound as masterbatches in a screw extruder such as a single or twin screw extruder to produce a resin suitable for film extrusion. Alternatively, all components can be blended in the feed hopper of a blown film extruder and subsequently extruded into sheeting.) The film from the bubble extruder is collapsed then slit and opened to provide sheet material. The general operating conditions for such equipment is well known to those skilled in the art.

Typically, depending on the loading of titanium dioxide the sheet material of the present invention will degrade in a period of time from about 30 to 160, preferred from 40 to 120, most preferably from 50 to 90 days in outdoor exposure in an environment having an annual total radiation (i.e. UV, IR, visible, etc) exposure level from about 80 to 180, preferably from 100 to 140, most preferably about 120, kcal/cm$^2$.

The following examples are intended to illustrate the invention and are not intended to limit it. In the examples unless otherwise indicated ppm is parts by weight per million parts by weight and % is weight %.

EXAMPLE 1

Linear low density polyethylene was extruded and formed into a sheet (control). The sheet had a thickness of 0.3 mils. To the same base polymer was added 300 ppm of cerium stearate (Ce Stearate only). To the same base polymer was added 300 ppm of cerium stearate and 10,000 ppm of titanium dioxide (rutile) having a particle size of about 0.018 microns (CeST+TiO$_2$). The compounds were extruded under the same conditions to yield films.

The resulting films were exposed to ultra violet light in a Xenon arc weathometer. The samples were tested at about every 150 hours for percent elongation in the machine direction (MD).

The results are set forth in FIG. 1. FIG. 1 shows that cerium stearate enhances degradation and the addition of TiO$_2$ reduces the rate of degradation.

What is claimed is:

1. A photodegradable polyethylene sheet material having a thickness from 0.1 to 5 mills consisting essentially of polyethylene, from 200 to 400 parts per million of a cerium salt of a C$_{16-20}$ fatty acid and from 1,000 to 20,000 ppm of titanium dioxide having a particle size of less than 0.05 microns.

2. The photodegradable sheet material according to claim 1, wherein said titanium dioxide is present in an amount from 5,000 to 12,500 parts per million.

3. The photodegradable sheet material according to claim 2, wherein said titanium dioxide has a particle size from 0.010 to 0.020 microns.

4. The photodegradable sheet material according to claim 3, wherein said titanium dioxide is rutile.

5. The photodegradable sheet material according to claim 4, wherein said fatty acid is stearic acid.

6. The photodegradable sheet material according to claim 5, wherein said sheet is from about 0.3 to 1.0 mils thick.

7. The photodegradable sheet material according to claim 6 wherein said olefin is linear low density polyethylene.

* * * * *